Patented Apr. 8, 1930

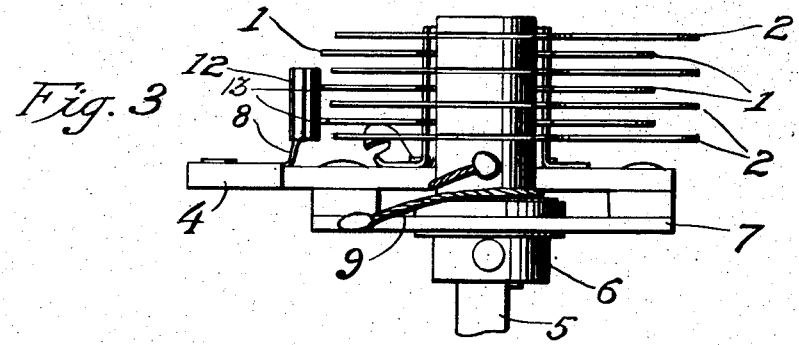
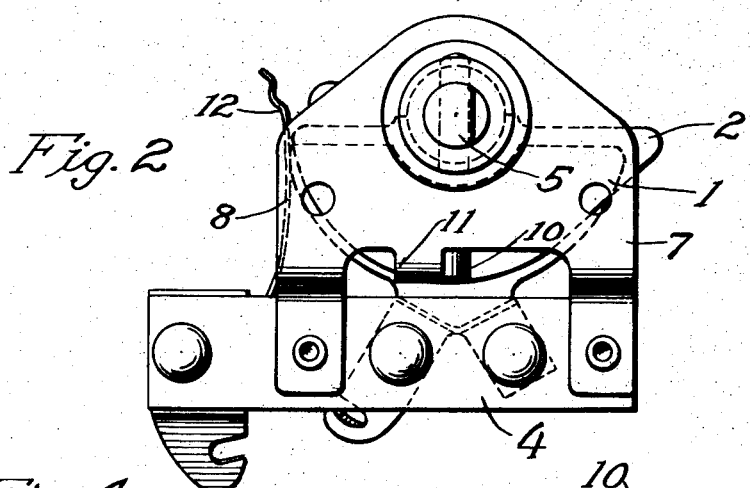
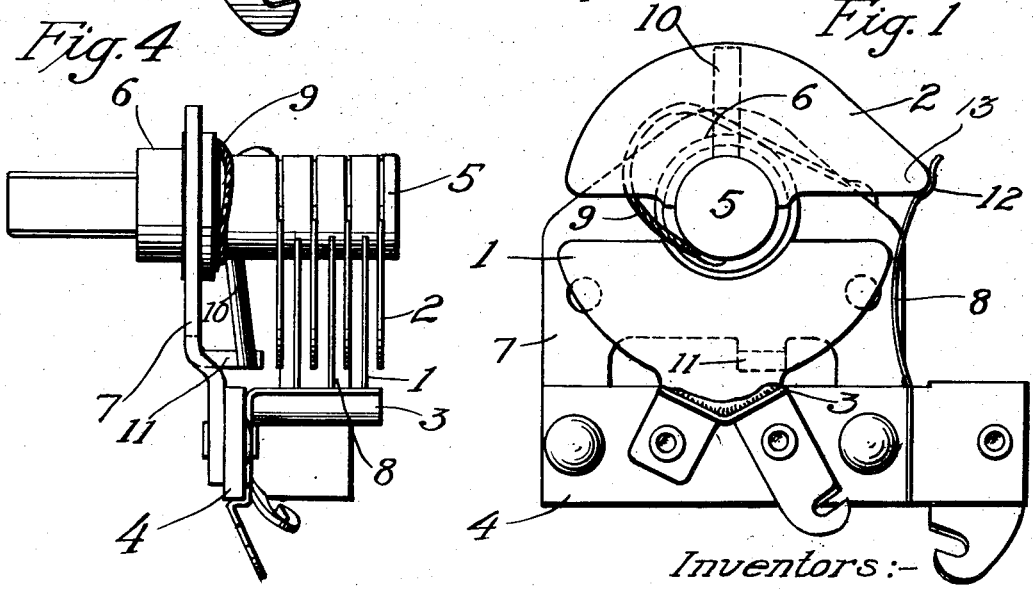

1,754,105

UNITED STATES PATENT OFFICE

WALTER E. HOLLAND AND DAVID P. EARNSHAW, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA

RADIO RECEIVER CONTROL

Application filed April 11, 1929. Serial No. 354,234.

The present invention relates to variable electrical condensers and particularly to a switching means which operates in connection with the rotor and stator elements thereof.

The invention, in its broader aspects, is applicable to any electrical system where it is desired to make or break an electrical circuit by the use of a switch operated by the fixed and movable parts of a condenser therein. It is particularly useful in radio receivers employing a unilateral mutual impedance device or other means adapted to amplify the intensity of the received signals.

The invention will be more fully understood by the following description taken in connection with the accompanying drawings:

Fig. 1 is an elevation of a condenser and switch embodying the invention, showing the movable member of the condenser in contact with the switch blade;

Fig. 2 is an elevation showing the movable member out of contact with the switch blade; and Figs. 3 and 4 are top and side views, respectively, seen from above and from the right of Fig. 2.

The condenser is formed of a stator 1 comprising a group of stationary metallic plates and a rotor 2 comprising a group of movable metallic plates. The stationary plates are illustrated as semi-circular, spaced apart, and secured to a common base 3, which in turn is attached to a supporting member 4 of insulating material. The rotating plates are shown as similarly formed and secured at intervals to a central shaft 5 rotatably mounted by means of a bearing 6 in the arm 7 which in turn is attached to the supporting member 4. The switch blade 8 is formed of a spring metal strip secured at one end to the supporting member 4 and so arranged as to be normally in direct contact with the plates of the stator 1 of the condenser. The blade is provided with a recess 12 at one end and the plates of the rotor 2 each have an extension at one corner, as shown at 13. The wire shunt 9 is attached to the rotor shaft 5 and also to the arm 7 in such a manner as to allow the full movement of the rotor between the limits of its travel and give perfect electrical connection between the rotor and the arm 7. The rotor shaft carries a pin 10 which acts as a stop when it comes into contact with a protuberance 11 on the arm 7.

As the rotor plates are adjusted from minimum to maximum capacity, the extensions 13 on the plates come into contact with the switch blade 8 and engage the recess 12, thus making an electrical contact between the rotor and switch. At the same time, the switch will resiliently hold the rotor in this position. In order to give good electrical contact between the switch blade and the condenser plates, these parts may be silver plated. It is to be noted that when the switch blade 8 makes contact with the plates of the rotor 2, it does not make contact with plates of the stator 1.

We have herein shown and described a certain embodiment of the invention and a certain method of operation for the purpose of explaining its principle and showing its utility, but it will be obvious that modifications and variations are possible and we aim, therefore, to cover all such modifications and variations as fall within the scope of our invention, which is defined in the appended claims.

We claim:

1. In an electrical condenser, the combination of a rotor, a stator and a switch blade normally held resiliently in contact with said stator, said blade being in position to be engaged by said rotor to break the contact between it and the stator, and establish a contact between it and the rotor.

2. In an electrical condenser, the combination of a rotor having plates with extensions thereon, a stator, and a switch blade provided with a recess to receive the extensions on the rotor plates to hold the rotor.

3. In an electrical condenser, a rotor, a shaft rotatably mounting the rotor, an arm rotatably mounting said shaft, a member of insulating material supporting said arm, a stator affixed to said member of insulating material, and a resilient switch blade secured to said member and cooperating with the stator and rotor plates to control an electrical circuit.

4. A condenser for controlling an electric circuit comprising a group of stationary plates, a group of movable plates each having an extension, and a switch blade held resiliently against said stationary plates in position to be actuated by the movement of the movable plates to break an electrical circuit between the switch blade and the stationary plates and make an electrical circuit between the switch blade and the movable plates.

5. An electrical condenser comprising a group of stationary plates spaced apart, a base to which the plates are attached, a supporting member of insulating material for the base, a group of separated movable plates, a central shaft carrying the movable plates, an arm rotatably mounting the shaft, the supporting member of insulating material holding said arm, and a switch blade of resilient material positioned in cooperative relationship with the movable and stationary plates and affixed to the supporting member of insulating material.

WALTER E. HOLLAND.
DAVID P. EARNSHAW.